United States Patent

[11] 3,634,127

[72] Inventors Virgil W. Vogel;
Paul W. Vogel, both of Pekin, Ill.
[21] Appl. No. 840,113
[22] Filed June 17, 1969
[45] Patented Jan. 11, 1972
[73] Assignee Bird Provision Co.
Continuation-in-part of application Ser. No. 523,366, Jan. 27, 1966, now abandoned. This application June 17, 1969, Ser. No. 840,113

[54] METHOD OF PREPARING POULTRY PRODUCTS FOR PROLONGED STORAGE
6 Claims, 2 Drawing Figs.

[52] U.S. Cl. ..................................... 99/194, 99/108, 99/174
[51] Int. Cl. .....................................A22c 21/00, B65b 25/06
[50] Field of Search............................................ 99/107, 108, 109, 157, 159, 174, 187, 194

[56] References Cited
UNITED STATES PATENTS
2,198,209  4/1940  Musher ........................  99/157 X
3,050,401  8/1962  Kohler et al. ..................  99/157
3,124,462  3/1964  Vogel et al.....................  99/107 X Primary Examiner—Hyman Lord
Attorneys—Clarence A. O'Brien and Harvey B. Jacobson ABSTRACT: Meat removed from the carcasses of poultry packaged in an air-impermeable material promptly after slaughter and without prior cooling or addition of chemical preservatives. Between slaughter and packaging, the meat is exposed to ambient conditions while undergoing physical preparation such as emulsification and mixing during an exposure period of limited duration.

PATENTED JAN 11 1972 3,634,127

Virgil W. Vogel
Paul W. Vogel
INVENTORS.

METHOD OF PREPARING POULTRY PRODUCTS FOR PROLONGED STORAGE

This invention relates to the preparation of meat products and more particularly to the processing and packaging of poultry products constituting a variation from the process claimed in prior copending application U.S. Ser. No. 338,158, filed Jan. 16, 1964, with respect to which the present application is a continuation-in-part by virtue of copendency with prior application Ser. No. 523,366, filed Jan. 27, 1966, both now abandoned.

A primary object of the present invention is to provide a hot-boning method for preparing and packaging poultry without use of chemical preservatives, irradiation, inert gases or other such preservative treatments.

An additional object of the present invention in accordance with the foregoing object is to provide a method for preparing and packaging a poultry loaf obtained from freshly slaughtered chickens or turkeys in order to provide a product having an extended storage life.

In accordance with the present invention, the meat of poultry may be comminuted and partially emulsified at temperatures above 65° F., and salt added in order to produce a better binding quality in the finished product. It has been found, that the benefits of the process are available despite the addition of a certain amount of salt and the entrapment of air within the meat during a processing period not exceeding 6 hours from slaughter. This tolerance for salt and entrapped air is particularly significant when applied to the process of poultry products because of the steps involving the addition of salt and emulsification of a portion of the meat so as to acquire an adhesive property or tackiness as distinguished from the grinding of the meat to a fluent state as described and claimed in prior U.S. Pat. No. 3,124,462, which issued from an application copending with application, Ser. No. 338,158, filed Jan. 16, 1964, as aforementioned.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The basic requirements of the method of the present invention consist of processing the meat immediately following slaughter of the animal from which the meat is obtained within certain time and temperature limits coupled with the sealing of the meat within an air-impermeable packaging material such as Saran as well as other materials having comparable properties. Further, the meat is comminuted during its processing at a temperature substantially above 65° F. The meat when packaged is reduced in temperature below ambient temperature for the first time for storing purposes, resulting in an unexpectedly long storage life with a surprising preservation of fresh flavor and lack of discoloration. This is accomplished without use of chemical preservatives, irradiation or inert gases. By avoiding the latter preservative treatments, the loss of flavor and freshness incident thereto is eliminated.

In regard to meat obtained from freshly slaughtered poultry, it has been found that bacteria growth is reduced and the oxygen of entrapped air tolerated apparently because of some biological mechanism in the remaining live tissues. The internal tissue temperature of the meat apparently reflects the amount of cellular activity involved, which activity is progressively reduced with time following slaughter of the animal as manifested by the spoilage of the meat. Although the phenomena involved is not completely understood and known, it is apparent that temperature, time and the amount of entrapped oxygen are interacting factors by virtue of which variations in one factor may affect the course of spoilage. Further, investigations have shown that microbial flora associated with poultry is different from that of other meats such as beef perhaps due to differences in initial contamination. Thus, the course of spoilage caused by microbial flora in one type of meat forms no basis for predicting the course of spoilage in other types of meat. In connection with poultry however, it has been found in accordance with the present invention that within a maximum exposure period of 6 hours, variation of one of said interacting factors will be tolerated at the expense of other factors without any substantial reduction in storage life. For example, a greater amount of entrapped air will be tolerated if the meat is packaged at a higher temperature and within a shorter period of time following slaughter. This is especially important in connection with the processing of poultry products since a substantial amount of air becomes entrapped when chopping the meat to the extent necessary to cause emulsification thereof.

Figure 2:
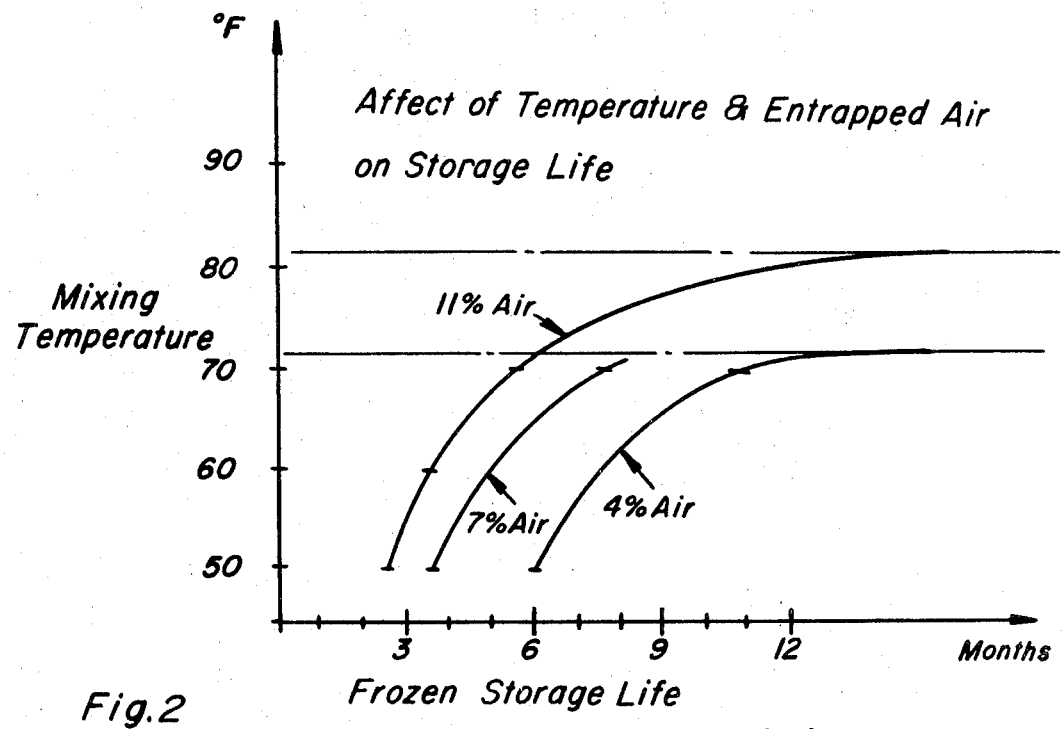
FIG. 2 is a graphical display of data illustrating the affect of temperature and entrapped air on the storage life of products prepared in accordance with the present invention.

The graph of FIG. 2 illustrates the relationship of percentage entrapped air in hot boned and salted meat to mixing temperatures which are the lower values to which the meat temperature declines prior to packaging. Since these temperatures depend upon the duration of the exposure period, it will be appreciated that the tolerable percentage of entrapped air depends upon the duration of the exposure period. For example, FIG. 2 shows that meat processed during an exposure period having a mixing temperature below 72° F. will tolerate entrapped air of 4 percent while 7 percent and 11 percent air is intolerable since the storage life would then be limited.

Time and temperature conditions in one actual example of the process are outlined in the following chart 1 and in FIG. 1. It should be appreciated however, that the time and temperature values given are merely exemplary and that the temperature and time conditions must be tailored to the amount of salt added, the amount of entrapped air in accordance with a relationship such as identified in FIG. 2, the conditions within the processing plant and the lean content of the meat.

CHART 1

POULTRY LOAF

| Operation | Elapsed Time Hours | Temperature ° F. Chicken | Turkey |
|---|---|---|---|
| Slaughter | 0 | live body temp. | live body temp. |
| Eviscerate and bone | ¾ | 95 | 95–97 |
| Chop, blend and salt | 1¼ | 85 | 90–92 |
| Package | 1¾ | 76–78 | 82–85 |
| Storage | 2¼ | 76–0 | 82–0 |

The foregoing chart outlines typical conditions under which the method of the present invention is practiced in order to prepare either chicken or turkey loaves. The accepted and prescribed method for processing poultry heretofore, has always involved slaughter, dressing and chilling of the meat prior to processing and packaging thereof. Processing or packaging of the meat had been performed following a chilling period of 24 hours or longer so that the products when packaged have had an expected frozen storage life of approximately 4 to 5 months before any flavor change could be detected. When the processing involved the addition of salt or comminution of the meat, the storage life was substantially reduced.

CHART 2

| Product | Packaging temp. (° F.) | Packaging time (hours) | Percent air | Storage temp. (° F.) | Storage life |
|---|---|---|---|---|---|
| Turkey roll, 1½% salt | 70-90 | Under 6 | 4-8 | 0 | Over 90 days. |
|  | 70-90 | Over 6 | 4-8 | 0 | Under 90 days. |
| Chicken loaf, 1½% salt | 76-78 | 1¾ |  | 0 | Over 2 years. |
| Turkey loaf, 1½% salt | 82-85 | 1¾ |  | 0 | Do. |

In the example of the present invention, outlined in chart 1, processing of the meat is initiated immediately after slaughter so that the evisceration and boning of the animal is completed within three-quarters of an hour following slaughter. In view thereof and because of the immersion of the animal after slaughter into hot water at 140° F. for removal of feathers, upon completion of the boning step the meat will be at a temperature of 95° F. in the case of chicken and 95° to 97° F. in the case of turkey as also shown on the chart. After the meat has been chopped, blended, and 1½ percent salt added thereto in dry form or as a brine solution, within 1¼ hours following slaughter, the temperature of the meat declined to 85° F. in case of chicken and 90° to 92° F. in the case of Turkey When packaging of the meat was completed within 1¾ hours following slaughter, it declined in temperature to 76°- 78° F. in the case of chicken and 82°-85° F. in the case of turkey, substantially above the ambient temperature at which the processing zone is maintained. After elapse of 2¼ hours following slaughter, the product was reduced to a storage temperature of 0° F. The expected frozen storage life of products prepared in accordance with the conditions outlined in chart 1 will be over 2 years.

In connection with the preparation and packaging of turkey rolls, one of the problems encountered in addition to the short storage life, is the binding quality of the meat during cooking thereof by the consumer. It has been found that if an emulsion of trimmings is made and blended with chunks or cuts, the meat will bind better and therefore make a more acceptable end product. FIG. 1 diagrams the formation of a turkey roll product in accordance with the present invention. At station 10, the animals are slaughtered, defeathered and eviscerated after which they are immediately boned at station 12. The boned products are separated into chunks at station 14 and trimmings at station 16 which are at 90° F. Depending upon the type of end product desired, a predetermined quantity of salt is introduced to the trimmings in the form of a 10 percent brine solution 18 and the trimmings are then chopped to an extent necessary to produce an emulsion 20, wherein the meat is in a tacky state. Thus, the emulsified portion of the meat acquires a binding or adhesive property in accordance with this invention as distinguished from the fluent state of the meat after grinding in accordance with the invention as claimed in U.S. Pat. No. 3,124,462, aforementioned.

It will also be noted, that during the chopping of the trimmings, the temperature thereof rises from 90° to 92° F. because there is no deliberate chilling of the trimmings during the chopping operation. Because of the hot-boning procedure utilized, the temperature of the trimmings while being emulsified remains above 65° F. contrary to what was heretofore thought to be practicable; see page 351, third paragraph, "The Science of Meat and Meat Products," American Meat Institute Foundation, published 1960 by W. H. Freeman and Company. Therefore, the process of the present invention does not require the chilling of the brine solution nor use of any other chilling facilities.

Figure 1:
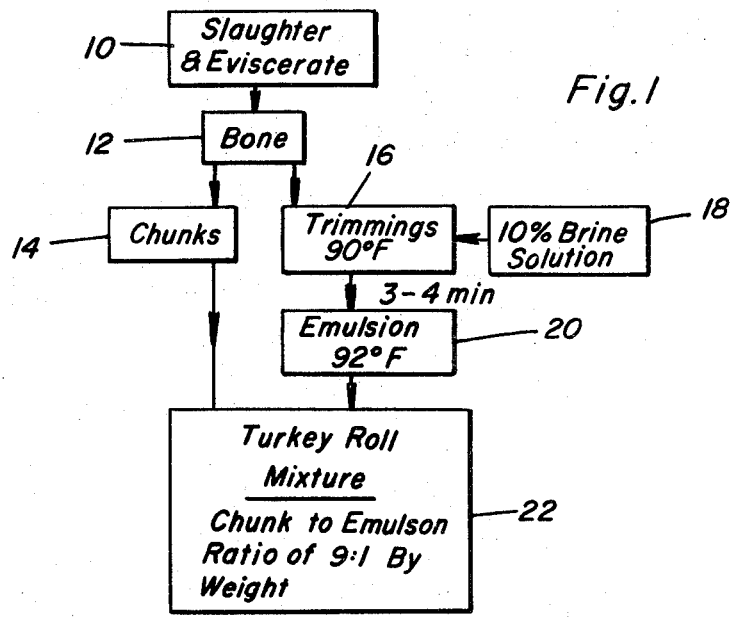
FIG. 1 is a schematic workflow diagram illustrating one example of the process practiced in accordance with the present invention.

The emulsified trimmings are then mixed with the chunks as shown in FIG. 1 to form a turkey roll mixture 22. A chunk to emulsion weight ratio of 9:1 has been found suitable in order to produce a product having good binding qualities. After mixing, the meat is stuffed into air-impermeable packaging material and sealed. Once the product is sealed within its air-impermeable packaging material, it is rapidly reduced in temperature to the storage temperature for the first time.

As shown in the following chart 2, the time limit within which processing of the turkey roll must be performed, The emulsified trimmings are then mixed with the chunks as shown in FIG. 1 to form a Turkey roll mixture 22. A chunk to emulsion weight ratio of 9:1 has been found suitable in order to obtain a prolonged storage life, is 6 hours following slaughter. It will be appreciated, that in connection with poultry products the entrapment of air and the addition of salt is tolerable because of the interrelationships between the time, temperature and air factors as aforementioned in connection with FIG. 2.

From the foregoing description, the practice and advantages of the method of the present invention will be apparent. In addition to the obvious benefits obtained in providing a fresh product having a prolonged storage life without any significant loss in flavor or discoloration, the method of the present invention also has the advantage of avoiding the chilling of meat during emulsification for which reason chopping at temperatures above 65° F. is significant. Further, the method of the present invention will tolerate the addition of salt and the entrapment of air within a maximum exposure period of 6 hours. This tolerance of entrapped air and the time limit are significant because of the extent to which the meat is chopped to obtain an emulsion having a pastelike consistency in the preparation of poultry loaves and turkey rolls as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, filling within the scope of the invention.

What is claimed as new is as follows:

1. A method of preparing food products for prolonged storage in a fresh condition comprising the steps of: slaughtering poultry; removing meat therefrom immediately after slaughter; comminuting a portion of said meat at temperatures substantially above 65° F. under ambient temperature conditions; mixing portions of said comminuted meat to produce a meat mixture having the desired binding quality, said mixing being completed in less than approximately 6 hours following slaughter before the temperature of the meat declines to ambient value; packaging the mixture in an air-impermeable material immediately after said mixing; and then reducing the temperature of the packaged mixture below ambient value, said steps of comminuting and mixing the meat include emulsifying a portion of the meat for mixing with chunk portions.

2. A method of prolonging the storage life of a product obtained from freshly slaughtered poultry comprising the steps of: comminuting meat obtained from poultry at temperatures substantially above 65° F. during gradual decline in temperature thereof to an ambient temperature; sealing said meat within an air-impermeable packaging material within approximately 6 hours following slaughter at a temperature above ambient temperature; and rapidly cooling the meat to a storage temperature below ambient temperature immediately following packaging, wherein said step of comminuting the meat includes the steps of eviscerating and boning the meat to form both chunks and trimmings, emulsifying the trimmings, and including the further steps of mixing the emulsified trimmings with the chunks at a 9:1 weight ratio of chunks to trimmings and adding salt in the form of a 10 percent brine solution during emulsification.

3. A method of preparing poultry for prolonged storage at a storage temperature below ambient temperature comprising the steps of: obtaining meat in the form of chunks and trimmings from a freshly slaughtered animal at an elevated temperature above ambient temperature; emulsifying the trimmings at a temperature substantially above 65° F.; mixing the trimmings with the chunks at a predetermined weight ratio and with a quantity of salt to produce a product having the desired binding quality, said mixing being completed before elapse of approximately 6 hours and decline in temperature of the meat below approximately 70° F. following slaughter of the animal; packaging the mixture in an air-impermeable material immediately following mixing; and reducing the temperature of the packaged product to said storage temperature immediately following packaging.

4. A method of preparing poultry for prolonged storage without use of chemical preservatives comprising the steps of: removing meat from freshly slaughtered poultry carcasses by hot boning under ambient conditions; comminuting said meat while exposed to ambient conditions during an exposure period not exceeding approximately 6 hours from slaughter and while said meat is declining in temperature during the exposure period toward a lower limit above approximately 65° F.; sealing the comminuted meat within an air-impermeable packaging material to terminate said exposure period; and reducing the temperature of the packaged meat for the first time to a storage temperature below ambient temperature.

5. The method of claim 4 wherein said storage temperature is of freezing value.

6. The method of claim 4 wherein a portion of the comminuted meat is emulsified by introducing a brine solution and chopping until a pasty consistency is obtained.

* * * * *